(12) United States Patent
Pangilinan et al.

(10) Patent No.: US 6,756,579 B2
(45) Date of Patent: Jun. 29, 2004

(54) OPTICAL FIBER BASED APPARATUS AND SENSOR WITH ENHANCED SIGNAL FOR PRESSURE MEASUREMENTS

(75) Inventors: Gerardo I. Pangilinan, Alexandria, VA (US); Thomas P. Russell, Manassas Park, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 179 days.

(21) Appl. No.: 10/106,763

(22) Filed: Mar. 27, 2002

(65) Prior Publication Data

US 2004/0075061 A1 Apr. 22, 2004

(51) Int. Cl.[7] .............................................. G01B 11/16
(52) U.S. Cl. ............................ 250/227.14; 250/227.18; 73/655; 385/12
(58) Field of Search ......................... 250/458.1, 227.14, 250/227.18, 227.16; 385/13, 12

(56) References Cited

U.S. PATENT DOCUMENTS

| | | | |
|---|---|---|---|
| 4,492,121 A | * | 1/1985 | Lehto ........................... 73/705 |
| 4,599,901 A | | 7/1986 | Hirschfeld .................... 73/705 |
| 4,768,886 A | | 9/1988 | Hirschfeld et al. .......... 374/161 |
| 4,805,461 A | | 2/1989 | Gupta et al. ................... 73/800 |
| 5,293,046 A | * | 3/1994 | Wheatley ................. 250/458.1 |
| 6,184,535 B1 | * | 2/2001 | Kashima et al. .......... 250/459.1 |

* cited by examiner

Primary Examiner—Phillip A. Johnston
(74) Attorney, Agent, or Firm—Mark Homer

(57) ABSTRACT

An apparatus for measuring pressure in a medium comprises a laser for emitting light; a dichroic beam splitter that reflects the light from the laser; a first lens that receives and focuses the light from the beam splitter; a first optical fiber for receiving the light from the first lens; a crystal having fluorescence properties and having a hemispherical shape, the crystal being attached to an end of the first optical fiber; a second lens that receives and focuses fluorescence generated by the crystal and reflected by the dichroic beam splitter; a second optical fiber for receiving the fluorescence from the second lens; a spectrometer that receives the fluorescence from the second optical fiber; a streak camera connected to the spectrometer; a charge-coupled device connected to the spectrometer; and a delay generator connected to the charge-coupled device, the streak camera and the laser.

6 Claims, 3 Drawing Sheets

OPTICAL FIBER BASED APPARATUS AND SENSOR WITH ENHANCED SIGNAL FOR PRESSURE MEASUREMENTS

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to optical measurement of pressure and in particular to optical measurement of pressure based on an optical signal generated by a crystal.

The measurement of transient pressures in a shock process is crucial in designs of explosive devices, weapon systems, mine detection and remediation, armors and many other applications. Some known methods use ruby fluorescence to measure the temporal profile of pressure as a shock traverses a material. Two groups have demonstrated ruby fluorescence as a dynamic pressure gauge (See P. D. Horn, and Y. M. Gupta, *Phys. Rev.* 39, 973 (1989) and G. I. Pangilinan, M. R. Baer, J. Namkung, P. Chambers, and T. P. Russell, *Appl. Phys. Lett.* 77, 684 (2000)). Apparatus for measuring pressure using ruby fluorescence are disclosed in U.S. Pat. No. 5,293,046 to Wheatley; U.S. Pat. No. 4,805,461 to Gupta et al. and U.S. Pat. No. 4,492,121 to Lehto.

One problem with prior fluorescence systems is the small signal that is generated. To minimize the perturbation to the shock being measured, the crystal used as a sensor needs to have small dimensions. FIGS. 1A and 1B show two known methods of using ruby crystals to measure fluorescence. FIG. 1A shows a ruby disk 30 about 200 microns thick and 1 inch diameter sandwiched between two sapphires 32 each about half an inch thick. Fluorescence from the ruby disk 30 is remotely measured through relay lenses 34 that deliver the exciting beam and the fluorescence between the optical fiber 36 and the ruby 30. The shock wave incident on the whole sapphire piece is measured but only the fluorescence from converging rays 38 is collected.

A minimal perturbation to the shock being measured is accorded by the configuration shown in FIG. 1B. In FIG. 1B, the ruby 40 is directly mounted onto the fiber 36. The ruby 40 is a disk about 200 microns thick and 400 micron diameter.

To resolve spatial and temporal properties of a shock wave, a smaller sensor is required; however the fluorescence signal will decrease correspondingly. Recently, these limitations of the current methods to collect signal were recognized and sophisticated nonlinear methods have been proposed to increase signal. The added sophistication, however, makes the measurements more difficult to apply to field conditions where the need is greatest. There is a strong need to collect fluorescence from small samples at fast times for single-event experiments.

SUMMARY OF THE INVENTION

The invention includes an apparatus for measuring pressure in a medium, comprising a laser for emitting light; a dichroic beam splitter that reflects the light from the laser; a first lens that receives and focuses the light from the beam splitter; a first optical fiber for receiving the light from the first lens; a crystal having fluorescence properties and having a hemispherical shape, the crystal being attached to an end of the first optical fiber; a second lens that receives and focuses fluorescence generated by the crystal and reflected by the dichroic beam splitter; a second optical fiber for receiving the fluorescence from the second lens; a spectrometer that receives the fluorescence from the second optical fiber; a streak camera connected to the spectrometer, a charge-coupled device connected to the spectrometer; and a delay generator connected to the charge-coupled device, the streak camera and the laser.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

The present invention improves the collection of fluorescence signals and thus permits measurement of pressure with faster time resolutions and better accuracy.

A brief description of the fluorescence emanating from a crystal and the systematic behavior of light through a collection optical fiber is helpful for devising methods to improve signal collection. Only light within a cone is transmitted with very little loss through a fiber. The fluorescence from a ruby crystal emanates in all directions equivalently. In relaying this signal to any optical system like a lens or an optical fiber, however, only that portion emanating in a cone can be collected. The ratio of the collected to the total fluorescence signal is rather small. It is about 3% in the faster ruby fluorescence systems used for shock and less than 1% in most other spectrometer systems. The rest of the signal is lost, and is not collected.

Figure 2:
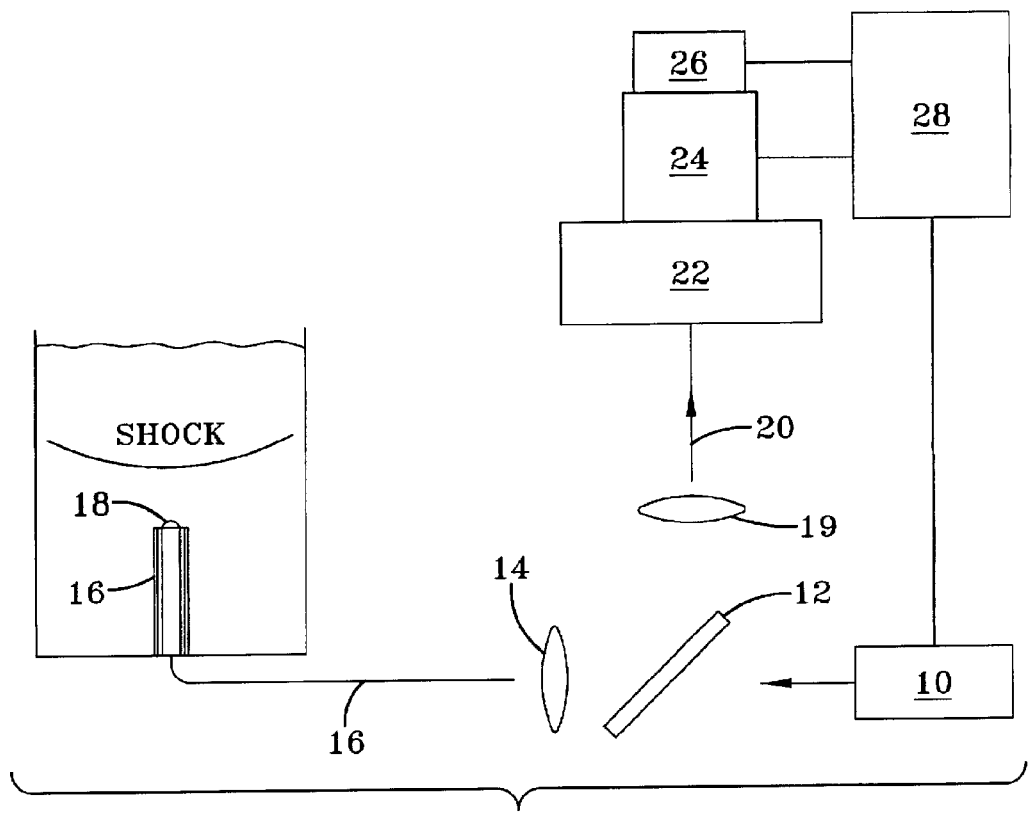
FIG. 2 schematically shows the inventive apparatus for measuring the temporal profile of pressure in a shock wave using time-resolved ruby fluorescence spectra.

FIG. 2 shows one embodiment of an apparatus for measuring the temporal profile of pressure in a shock wave using time-resolved ruby fluorescence spectra. A 2-watt laser 10 operating at 532 nm is used to excite the ruby fluorescence. At this wavelength, the excitation beam is transmitted through a dichroic beam splitter 12 and is focused by a lens 14 into an optical fiber 16. The ruby crystal 18 is epoxied to the end of the fiber 16 and is appropriately placed where the pressure is to be measured.

Without lost of generality, the pressure measured is pressure underwater. The ruby fluorescence (at 693 and 694 nm) is collected by fiber 16, reflected by the beam splitter 12 and focused by a lens 19 to a second optical fiber 20. The signal is relayed to a spectrometer 22 by the second optical fiber 20. The spectrometer 22 disperses the signal as a function of wavelength. The collected signal from the spectrometer 22 is further dispersed in time orthogonal to the wavelength dispersion by a streak camera 24 which outputs intensity as a function of two dimensions: wavelength and time.

The streak rate of the camera 24 can be set to provide fast 20 ns pressure data points for up to 0.8 microseconds total. Slower snapshots are readily attainable all with a maximum of 40 data points (nominally twenty data points are obtained from a single measurement). A two dimensional charge-coupled device (CCD) 26 is used to collect and digitize the intensity as a function of wavelength and time. The laser 10, streak camera 24, and CCD 26 are synchronized with the arrival of the shock at the ruby sensor 18 by a delay generator 28.

Figure 3:
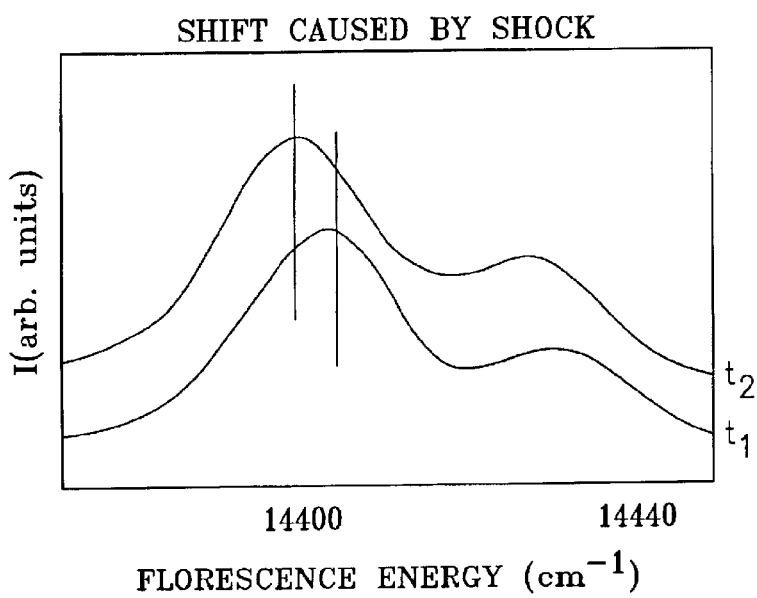
FIG. 3 is an example of the ruby spectra before and during the shock passage.

Examples of the ruby spectra before and during the shock passage are shown in FIG. 3. The shifts of the positions of the ruby fluorescence are used to infer the pressure. The fluorescence yields the pressures as the shock crosses the ruby sensor 18. There are roughly twenty time intervals where pressure is obtained in such an apparatus.

Figure 4:
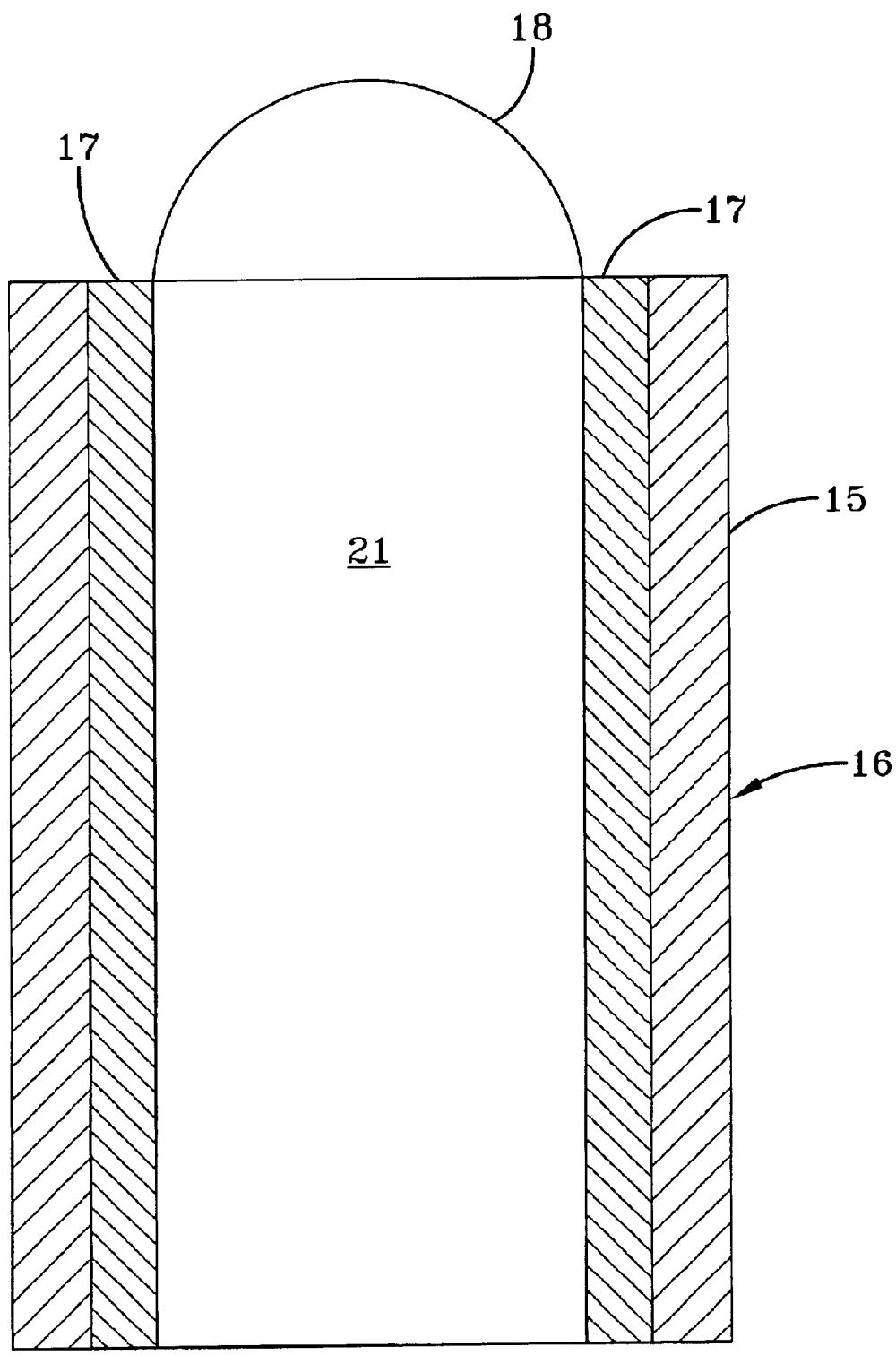
FIG. 4 is an enlarged view of the crystal of FIG. 2

FIG. 4 is an enlarged view of the ruby crystal 18 of FIG. 2. The ruby 18 is hemispherical in a shape. Ruby 18 is attached to end of optical fiber 16. Optical fiber 16 includes an outer sheath 15, a cladding 17 and a core 21. Preferably, the diameter of the ruby 18 is substantially the same as the diameter of the core 21. An exemplary diameter of ruby 18 is 400 microns.

Figure 1B:
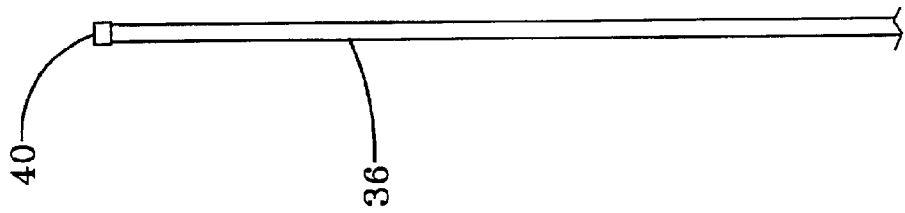
FIGS. 1A and 1B show two known methods of using ruby crystals to measure fluorescence.
Figure 1A:
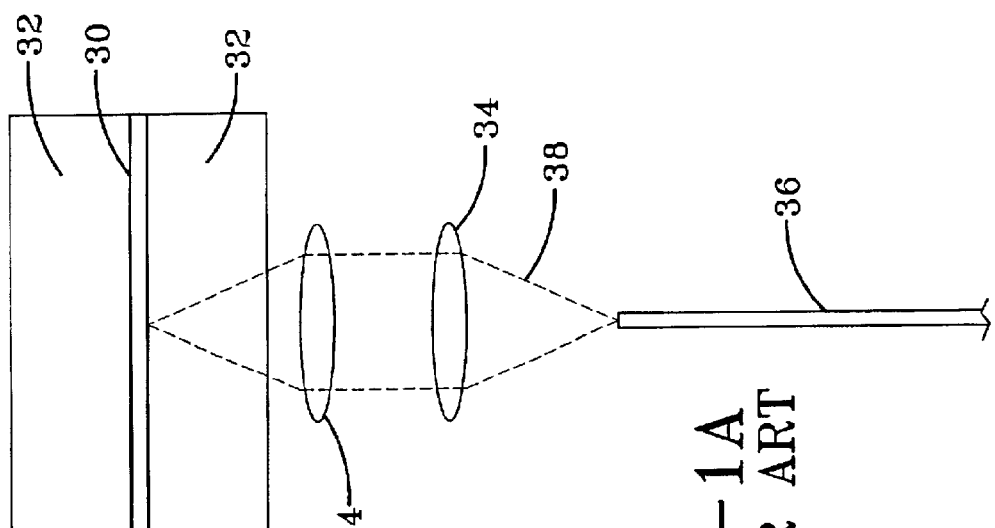

Ruby 18 is comparable in volume to the crystal shown in FIG. 1B. However, by using the hemispherically shaped ruby 18, much more of the fluorescence signal is collected into the fiber 16. First, part of the light reflected from the curved portion of the crystal 18 is reflected back at an angle within the collection cone of the fiber 16. Second, part of the light reflected from the curved portion of the crystal 18 undergoes total internal reflection (100%). Crystals other than ruby may be used if they possess the requisite fluorescence property.

The present invention, unlike other proposed systems using more complicated non-linear optical techniques and analysis, uses linear fluorescence process. The present invention improves signal collection. This improvement in signal collection is crucial to shock measurements. Assuming a cost of $5K per experiment in materials alone, a fivefold increase in signal provides better accuracy of measurement, equivalent to performing 5 times less experiments. Moreover, faster time resolutions are an effect of having more signals, so that a better description of the shock process can be obtained. The present invention achieves about a tenfold increase in signal in media such as air or water.

Solids can also be studied by using dabs of a well-character gel (transparent) around the ruby 18. The gel provides tight contact with the solid so that mechanical coupling allows the shock to be transported from the solid to the ruby piece. The invention enhances collection of fluorescence in any particular application and is thus useful whenever better signal collection is necessary. The optical signal may arise from fluorescence or scattered light such as Rayleigh or Raman scattering.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus for measuring pressure in a medium, comprising:

a laser for emitting light;

a dichroic beam splitter that reflects the light from the laser;

a first lens that receives and focuses the light from the beam splitter;

a first optical fiber for receiving the light from the first lens;

a crystal having fluorescence properties and having a hemispherical shape, the crystal being attached to an end of the first optical fiber;

a second lens that receives and focuses fluorescence generated by the crystal and reflected by the dichroic beam splitter;

a second optical fiber for receiving the fluorescence from the second lens;

a spectrometer that receives the fluorescence from the second optical fiber;

a streak camera connected to the spectrometer;

a charge-coupled device connected to the spectrometer; and a delay generator connected to the charge-coupled device, the streak camera and the laser.

2. The apparatus of claim 1 wherein the crystal comprises a ruby crystal.

3. The apparatus of claim 1 wherein a diameter of the crystal is substantially the same as a diameter of a core of the first optical fiber.

4. The apparatus of claim 1 wherein the crystal is attached to the end of the first optical fiber with epoxy.

5. The apparatus of claim 1 wherein the medium is one of a liquid and a gas.

6. The apparatus of claim 1 wherein the medium comprises a gel for transmitting pressure from a solid.

* * * * *